US012759597B2

(12) United States Patent
Auer et al.

(10) Patent No.: US 12,759,597 B2
(45) Date of Patent: Oct. 13, 2026

(54) MEASURING SYSTEM AND METHOD FOR MEASURING THE ELASTICITY OF AN OVERHEAD LINE OF A TRACK

(71) Applicant: PLASSER & THEURER EXPORT VON BAHNBAUMASCHINEN GESELLSCHAFT M.B.H., Vienna (AT)

(72) Inventors: Florian Auer, Vienna (AT); Martin Bürger, Linz (AT); Gerald Zauner, Wilhering (AT)

(73) Assignee: Plassser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 612 days.

(21) Appl. No.: 18/257,641

(22) PCT Filed: Dec. 10, 2021

(86) PCT No.: PCT/EP2021/085204

§ 371 (c)(1),
(2) Date: Jun. 15, 2023

(87) PCT Pub. No.: WO2022/128792

PCT Pub. Date: Jun. 23, 2022

(65) Prior Publication Data

US 2024/0043048 A1 Feb. 8, 2024

(30) Foreign Application Priority Data

Dec. 15, 2020 (AT) .............................. A 51091/2020

(51) Int. Cl.
*B61D 15/12* (2006.01)
*B60M 1/12* (2006.01)
(Continued)

(52) U.S. Cl.
CPC ............... *B61D 15/12* (2013.01); *B60M 1/12* (2013.01); *B60M 1/28* (2013.01); *B61D 1/08* (2013.01);
(Continued)

(58) Field of Classification Search
CPC ...... B61D 15/12; B61D 15/125; B61D 15/08; B61D 15/105; B60M 1/28; B60M 1/12;
(Continued)

(56) References Cited

U.S. PATENT DOCUMENTS 3,871,217 A * 3/1975 Miley ..................... G01L 5/042 73/DIG. 1
4,158,962 A * 6/1979 Conoval ................. G01L 5/042 73/DIG. 1
(Continued)

FOREIGN PATENT DOCUMENTS

CN 106932135 A * 7/2017 ............. G01L 5/042
CN 107300432 A * 10/2017 ............... G01L 5/04
(Continued)

OTHER PUBLICATIONS

Puschmann, R. et al.: Fahrdrahtlagemessung mit Ultraschall [Ultrasonic measurement of contact wire position]; Electric trains 109, Jul. 2011, Issue 7, S. 323-330, XP001563815,I SSN:0013-5437 Mentioned in application Paragraphs 5, 8.8.

*Primary Examiner* — S. Joseph Morano
*Assistant Examiner* — James William Jones
(74) *Attorney, Agent, or Firm* — Laurence A. Greenberg; Werner H. Stemer; Ralph E. Locher

(57) ABSTRACT

A measuring system for measuring the elasticity of an overhead line of a track includes a non-contacting sensor for detecting the position of a measuring point of the overhead line and an evaluation device for calculating the elasticity. A mechanical excitation device sets the overhead line into
(Continued)

vibration through active excitation. The sensor is set up to detect a vibration progression and the evaluation device is set up to derive mechanical properties of the overhead line from the vibration progression. The mechanical properties, such as the elasticity of the overhead line, are derived from characteristics of the corresponding vibration curves in the evaluation device. A method for measuring the elasticity of an overhead line of a track and a track construction vehicle are also provided.

7 Claims, 2 Drawing Sheets

(51) Int. Cl.

| | |
|---|---|
| ***B60M 1/28*** | (2006.01) |
| ***B61D 1/08*** | (2006.01) |
| ***B61K 9/08*** | (2006.01) |
| ***G01L 5/04*** | (2006.01) |
| ***G01L 5/06*** | (2006.01) |
| ***G01L 5/105*** | (2020.01) |
| ***H02G 1/00*** | (2006.01) |

(52) U.S. Cl.
CPC .............. *B61D 15/125* (2013.01); *B61K 9/08* (2013.01); *G01L 5/04* (2013.01); *G01L 5/042* (2013.01); *G01L 5/06* (2013.01); *G01L 5/105* (2013.01); *H02G 1/00* (2013.01)

(58) Field of Classification Search
CPC .. H02G 1/00; G01L 5/04; G01L 5/042; G01L 5/06; G01L 5/105
USPC .......................................................... 105/162
See application file for complete search history.

(56) References Cited

U.S. PATENT DOCUMENTS

| | | | | | |
|---|---|---|---|---|---|
| 4,565,099 | A * | 1/1986 | Arnold | G01L 5/042 | |
| | | | | 73/862.41 | |
| 2009/0320554 | A1* | 12/2009 | Watabe | G01B 11/24 | |
| | | | | 73/7 | |

FOREIGN PATENT DOCUMENTS

| | | | | | |
|---|---|---|---|---|---|
| CN | 109238536 | A | * | 1/2019 | G01L 1/25 |
| CN | 111174961 | A | * | 5/2020 | G01L 5/042 |
| CN | 111208022 | A | * | 5/2020 | G01N 3/317 |
| DE | 102007051478 | A1 | | 4/2009 | |
| DE | 102009057877 | A1 | * | 6/2011 | G01L 5/105 |
| FR | 2705780 | A1 | | 12/1994 | |
| JP | H10176968 | A | | 6/1998 | |
| JP | 2001030806 | A | * | 2/2001 | |
| JP | 2003189404 | A | | 7/2003 | |
| JP | 3745853 | B2 | | 2/2006 | |
| JP | 2012208095 | A | * | 10/2012 | |
| TW | 201043197 | A | | 12/2010 | |
| WO | 0206077 | A1 | | 1/2002 | |

* cited by examiner

MEASURING SYSTEM AND METHOD FOR MEASURING THE ELASTICITY OF AN OVERHEAD LINE OF A TRACK

FIELD AND BACKGROUND OF THE INVENTION

The invention relates to a measuring system for measuring the elasticity of an overhead line of a track, with a non-contacting sensor for detecting the position of a measuring point of the overhead line and with an evaluation device for calculating the elasticity. The invention further relates to a corresponding method and a track construction vehicle.

PRIOR ART

The quality of an overhead line of a track is significant for an uninterrupted current collection of an electrically operated rail vehicle. In particular at high speeds, vibrations in the overhead line must be avoided. When vibrations occur, contact between the current collector and the contact wire may be interrupted, resulting in material damage and signs of wear.

Railway operators such as Deutsche Bahn therefore demand a regular measuring of the elasticity for overhead lines. In this, the elasticity of the contact wire is recorded, which is also referred to as the flexibility of the contact wire. Equally, the non-uniformity of the elasticity over the longitudinal span between two masts is evaluated in order to draw conclusions about the quality of the overhead line design.

The paper Puschmann, R. et al.: *Fahrdrahtlagemessung mit Ultraschall* [Ultrasonic measurement of contact wire position]; *Elektrische Bahnen* 109, July 2011, Issue 7, S. 323-330, describes a method for measuring elasticity. In this method, the contact wire position is recorded in two measurement runs by means of an ultrasonic sensor. The first measurement is carried out in an unloaded state. In the second measurement, an adjustable force (for example 100 N) is exerted on the contact wire by means of a measuring current collector. In an evaluation device, the two superimposed measurements provide the elasticity of the contact wire. Specifically, an uplift of the contact wire divided by the contact pressure results in the elasticity.

SUMMARY OF THE INVENTION

The object of the invention is to improve a measuring system of the kind mentioned above in such a way that measuring the elasticity of the overhead line can be carried out in one measurement run. A further object of the invention is to indicate a corresponding method and an extended design of the measuring system.

According to the invention, these objects are achieved by the features of the independent claims. Dependent claims indicate advantageous embodiments of the invention.

In this case, a mechanical excitation device is arranged, by means of which the overhead line can be set into vibration through active excitation, with the sensor being set up to detect a vibration progression and with the evaluation device being set up to derive mechanical properties of the overhead line from the vibration progression. With the measuring system according to the invention, the overhead line is set into a defined vibration, with the resulting damped vibration being recorded by means of the sensor. In contrast to a static load, the active excitation involves a pulsed or sudden energy input into the overhead line. The overhead line is practically plucked or struck like the string of an instrument. The resulting temporal vibration progression is recorded.

From the characteristics of the corresponding vibration curves (amplitudes, damping constants, phase position), the mechanical properties such as the elasticity of the overhead line are derived in the evaluation device. Several parameters of the mechanical contact wire system can be determined by means of the dynamic measurement according to the invention. By comparison with reference measuring results, specific cases of damage can further be identified and targeted maintenance measures can be derived from them.

Advantageously, the sensor is an optical sensor, in particular a laser light-section sensor or a 3D laser scanner. This allows high measuring rates (several hundred measurements per second) to be achieved in order to record the vibration progression with sufficient accuracy. In particular, a 3D laser scanner can be used for recording further track components. For example, the progression of the top of a rail can be recorded in order to easily relate the contact wire position to the track position.

A further development of the system provides that the excitation device comprises a base unit and a triggering unit, with the triggering unit being adjustable in relation to the base unit by means of an actuating drive. With this arrangement, the excitation device can initially be positioned with respect to the overhead line. By means of the actuating drive, the triggering unit is finely adjusted to produce the desired pulsed excitation during the subsequent activation. Defined excitation amplitudes and/or defined excitation forces can be set by correspondingly actuating the triggering unit.

In an advantageous variant, the triggering unit comprises a hook which is adjustable in relation to a holder by means of a triggering drive. In this, the hook is moved relative to the overhead line, loading it in a pulsed manner.

Another advantageous embodiment of the triggering unit comprises a holding element which is adjustable in relation to a line receiving device by means of a triggering drive. For this, the pretension of the overhead line is briefly increased by means of the holding element. The holding element is then disengaged abruptly and the overhead line is released, causing a sudden excitation of the overhead line. In any case, the excitation direction can be vertical according to standard or in any other direction.

To further improve the measuring quality, another non-contacting sensor for detecting the vibration is arranged in a further measuring point at a defined distance from the sensor. This allows an extended measurement to determine phase shifts and wave delay times.

The method according to the invention for measuring the elasticity of an overhead line of a track by means of the measuring system provides that the overhead line is set into vibration by means of the mechanical excitation device, that the vibration progression is detected by means of the sensor in a measuring point, and that at least one mechanical property of the overhead line is derived from the vibration progression by means of the evaluation device. In this way, the elasticity of the overhead line can be recorded in one measurement run.

A further development of the method provides that the sensor is used to detect vibrations in a measuring point of a contact wire and, synchronously, vibrations in a measuring point of a carrying cable. In this way, several vibration curves are recorded, the characteristics of which (amplitudes, damping constants, phase position) can be further used to derive mechanical properties of the overhead line.

In addition, it is advantageous if vibrations are detected in a measuring point distanced in the longitudinal direction of the line by means of a further non-contacting sensor. This extended measuring method allows for a determination of the wave delay times and other characteristic parameters from the relative phase shifts between the measuring points.

A further object of the invention is a track construction vehicle with a vehicle frame which can, supported on rail-based running gears, be moved on a track, with the measuring system described being arranged on the track construction vehicle. Available equipment on the track construction vehicle, such as a 3D laser scanner, can be used as components of the measuring system. In particular, a crane can be used for positioning the excitation device. The excitation device is attached to the crane boom and can be moved in relation to the overhead line.

BRIEF DESCRIPTION OF THE FIGURES

In the following, the invention is explained by way of example with reference to the accompanying figures. The following figures show in schematic illustrations.

DETAILED DESCRIPTION OF THE INVENTION

Figure 1:
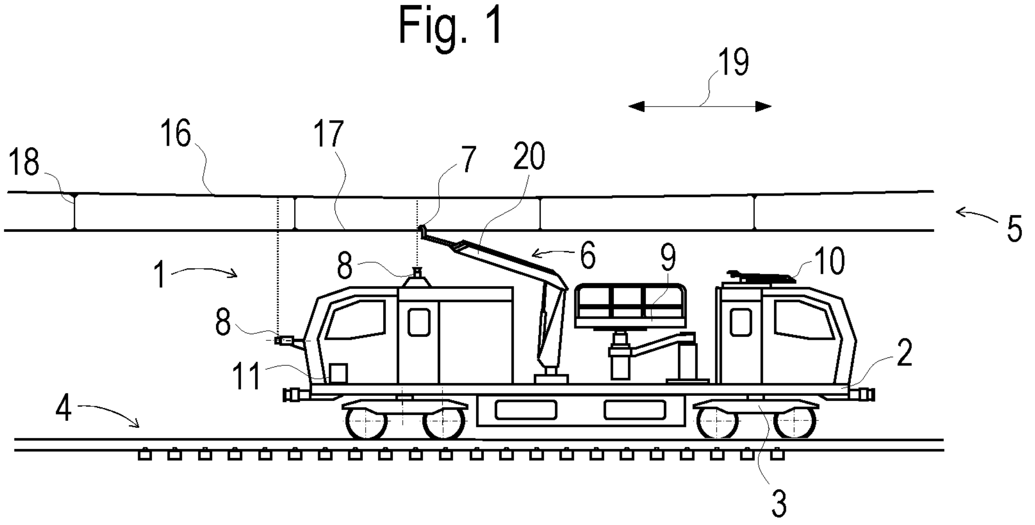
FIG. 1 Track construction vehicle with measuring system in a side view

The track construction machine 1 shown in FIG. 1 comprises a vehicle frame 2 that can be moved on rail-based running gears 3 on a track 4. The track 4 comprises an overhead line 5, the elasticity of which is determined by means of a measuring system arranged on the track construction vehicle 1. For this purpose, an excitation device 7 is arranged on a crane 6, by means of which the overhead line 5 can be set into vibration. A non-contacting sensor 8, for example a laser light-section sensor, is arranged on the roof of the track construction vehicle 1. In addition, there is another non-contacting sensor 8 on one front end of the vehicle, which is designed as a 3D laser scanner. The measuring system can be arranged in a corresponding manner on a track construction train, a tamping machine, a stabiliser, a track inspection vehicle and the like. All of these vehicles and vehicle combinations will be referred to as track construction vehicles 1 with reference to the present invention. In addition, the measuring system can be designed as a separate system that is only temporarily carried on the track construction vehicle 1.

In the track construction vehicle 1 shown, a lifting platform 9 is arranged on the vehicle frame 2, which can be used for repairs or maintenance work on the overhead line 5. A current collector 10 can be used to power the track construction vehicle 1. Advantageously, an element of the excitation device 7 that comes into contact with the overhead line 5 is insulated so that an excitation of the switched-on overhead line 5 is possible as well. The current collector 10 can also be used as a measuring current collector.

In addition to the excitation device 7 and the sensors 8, the measuring system comprises an evaluation device 11 to which the measuring results of the sensors 8 are fed. A processor is arranged in the evaluation device 11, which evaluates a recorded vibration curve 12. In this evaluation, mechanical properties of the overhead line 5 are derived from characteristics of the vibration curve 12 by means of suitable algorithms. The appropriate programming is the responsibility of the expert.

Figure 2:
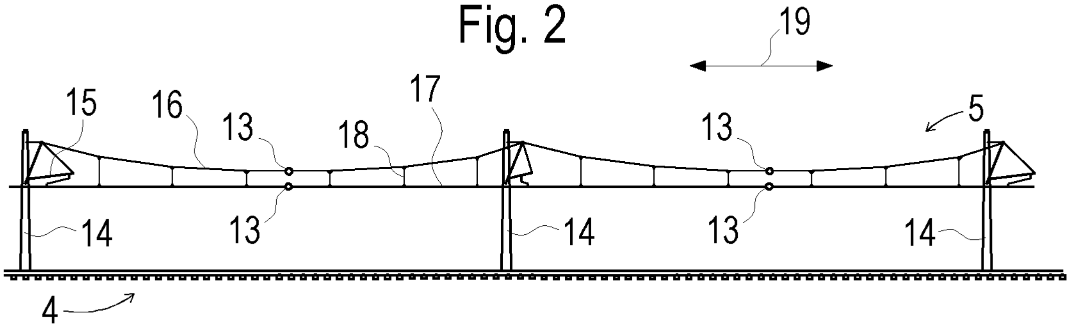
FIG. 2 Contact wire design along a track

In FIG. 2, several measuring points 13 are marked in an overhead line section. The design shown comprises masts 14 with cantilevers 15 to which a carrying cable 16 and a contact wire 17 are attached. In addition, the tensioned contact wire 17 is connected to the carrying cable 16 via droppers 18. In addition, other designs are known which can also be set into vibration according to the invention.

Preferably, the mechanical excitation of the overhead line 5 takes place approximately in the middle between two masts 14. Preferred measuring points 13 on the contact wire 17 and on the carrying cable 16 are also provided at this point. Accordingly, during a measuring process, the excitation device 7 and at least one sensor 8 are positioned in this area.

Further measurements are carried out in several measuring points 13 distanced in the longitudinal direction of the line 19 in order to determine wave delay times. For example, the 3D laser scanner arranged at the front end of a longer track construction train can be used for this purpose. The measurements are carried out synchronously at all measuring points 13 in order to allow for an evaluation of phase shifts in the recorded vibration curves.

Figure 3:
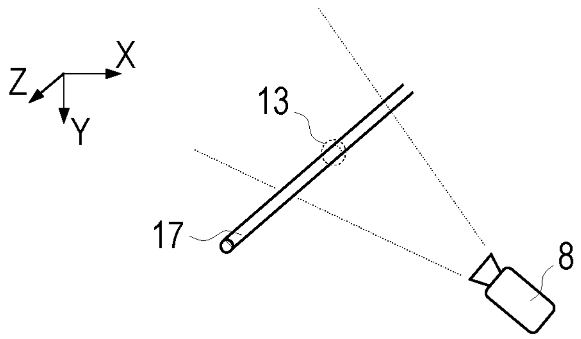
FIG. 3 Optical sensor and contact wire

FIG. 3 shows the sensor 8 designed as a laser light-section sensor and the contact wire 17 with the recorded measuring point 13. Here, the position of the measuring point 13 in a defined coordinate system XYZ is recorded with a high temporal and spatial resolution. In particular, at least one hundred measurements per second are carried out with an accuracy of 0.1 mm. The Z-axis of the coordinate system is aligned in the longitudinal direction of the line 19. The X-axis points in the transverse direction and the Y-axis is aligned in the direction of the acceleration of gravity.

The excitation of the overhead line 5 can occur in the Y-direction, according to the standard, or in any other direction. The resulting damped vibration is recorded in the X-direction and Y-direction in the measuring point 13. Taking into account a mounting angle of the sensor 8 relative to the Y-direction, the measured vibrations can also be recorded relative to the acceleration of gravity.

Figure 4:
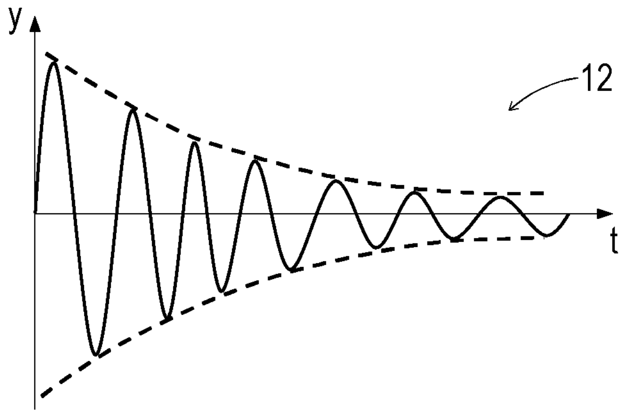
FIG. 4 Measured vibration curve of the contact wire

FIG. 4 shows an exemplary vibration curve 12 recorded at a measuring point 13 in a direction y over time t. Depending on the number of selected measuring points 13 and the excitation direction, a variety of such vibration curves 12 result, which are subsequently evaluated together by means of the evaluation device 11. The amplitudes and phase positions of the individual vibration cycles can be recorded directly. A damping constant can be derived from the decreasing amplitudes.

By comparing several synchronised vibration curves 12, relative phase shifts can be detected. This results in wave delay times and other characteristic parameters from which the mechanical properties of the overhead line are derived. Due to a measurement at several measuring points 13 in the longitudinal direction of the line 19, a non-uniformity of the elasticity can be detected as well. From this, the quality of the overhead line design can be easily concluded.

Figure 5:
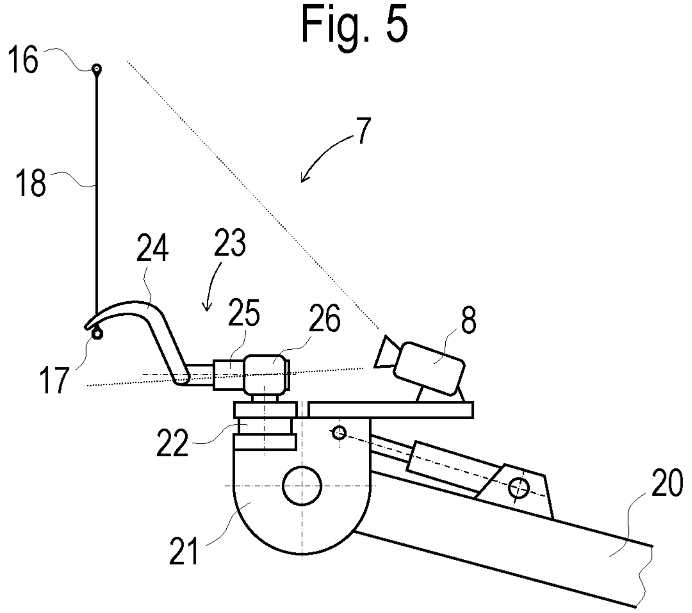
FIG. 5 Excitation device with hook

A first exemplary embodiment of the excitation device 7 is shown in FIG. 5. A swivelling base unit 21 is located on a crane boom 20. A triggering unit 23 can be adjusted in relation to the base unit 21 via an actuating drive 22. The triggering unit 23 comprises a hook 24 which is adjustable in relation to a holder 26 by means of a triggering drive 25.

To prepare for a measurement run, the triggering unit 23 is positioned by means of the crane boom 20. The fine adjustment of the position of the hook 24 above the contact wire 17 is done by means of the actuating drive 22. When the triggering drive 25 is actuated, the hook sweeps over the contact wire 17 and causes a pulsed energy input. This active excitation causes the overhead line 5 to vibrate.

Advantageously, the sensor 8 is also arranged on the base unit 21. In this way, there is always a clear spatial reference between the excitation point and the measuring points 13 on the contact wire 17 and on the carrying cable 16 above it.

Figure 6:
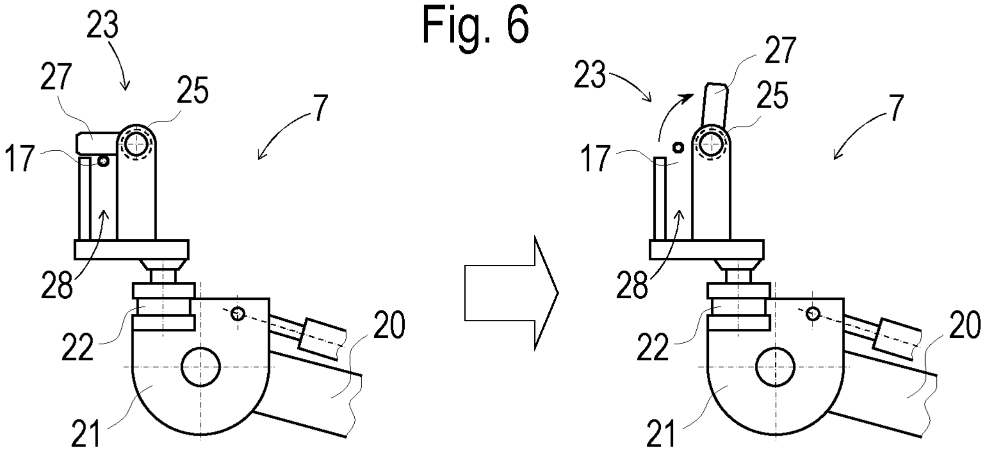
FIG. 6 Excitation device with holding element

FIG. 6 shows an alternative embodiment of the excitation device 7. Here, the triggering unit 23 comprises a holding element 27 which is adjustable in relation to a line receiving device 28 by means of a triggering drive 25. Prior to activation, the triggering unit 23 is positioned by means of the crane 6 in such a way that the contact wire 17 is received in the line receiving device 28 when the holding element 27 is in a released state.

Subsequently, the holding element 27 is tilted downwards and locked in place by means of the triggering drive 25. An electrically operated rotary drive can, for example, be used as triggering drive 25. By actuating the actuating drive 22, the triggering unit 23 is moved downwards, causing the holding element 27 to pull the contact wire downwards by a defined actuating path. A defined force can also be exerted via the actuating drive 22 (e.g. a pneumatic or hydraulic cylinder with distance sensor). For a sudden excitation of the overhead line 5, the locking of the holding element 27 is released via the triggering drive 25. In this, the holding element 27 releases the contact wire 17 abruptly, causing the overhead line 5 to vibrate.

The invention also includes further excitation devices 11 that are suitable for causing the overhead line 5 to vibrate by means of a pulsed or sudden excitation. For example, the contact wire 17 can be struck by means of a striking element. It should be noted that the striking element has a flat contact zone in order to prevent damage to the contact wire.

The invention claimed is:

1. A measuring system for measuring elasticity of an overhead line of a track, the measuring system comprising:
- a non-contacting sensor for detecting a position of a measuring point of the overhead line;
- an evaluation device for calculating the elasticity of the overhead line;
- a mechanical excitation device for setting the overhead line into vibration through active excitation;
- said mechanical excitation device including an actuating drive, a base unit and a triggering unit, said triggering unit being adjustable relative to said base unit by said actuating drive;
- said mechanical excitation device including a triggering drive, a holder and a hook, said hook being adjustable relative to said holder by said triggering drive;
- said non-contacting sensor configured to detect a vibration progression; and
- said evaluation device configured to derive mechanical properties of the overhead line from the vibration progression.

2. The measuring system according to claim 1, wherein said non-contacting sensor is an optical sensor or a laser light-section sensor or a 3D laser scanner.

3. The measuring system according to claim 1, wherein said non-contacting sensor is a first non-contacting sensor, and a second non-contacting sensor is disposed in a further measuring point at a defined distance from said first non-contacting sensor for detecting the vibration.

4. A method for measuring elasticity of an overhead line of a track, the method comprising:
- providing the measuring system according to claim 1;
- using said mechanical excitation device to set the overhead line into vibration;
- using said non-contacting sensor to detect the vibration progression in a measuring point of the overhead line;
- using said non-contacting sensor to detect vibrations in a measuring point of a contact wire and to synchronously detect vibrations in a measuring point of a carrying cable; and
- using said evaluation device to derive at least one mechanical property of the overhead line from the vibration progression.

5. The method according to claim 4, which further comprises providing said non-contacting sensor as a first non-contacting sensor, and providing a second non-contacting sensor to detect vibrations in a measuring point disposed at a distance from said first non-contacting sensor in a longitudinal direction of the overhead line.

6. A track construction vehicle, comprising:
- a vehicle frame;
- rail-based running gears supporting said vehicle frame for moving said vehicle frame on a track; and
- the measuring system according to claim 1 disposed on the track construction vehicle.

7. A measuring system for measuring elasticity of an overhead line of a track, the measuring system comprising:
- a non-contacting sensor for detecting a position of a measuring point of the overhead line;
- an evaluation device for calculating the elasticity of the overhead line;
- a mechanical excitation device for setting the overhead line into vibration through active excitation;
- said mechanical excitation device including an actuating drive, a base unit and a triggering unit, said triggering unit being adjustable relative to said base unit by said actuating drive;
- said mechanical excitation device including a triggering drive, and said triggering unit including a line receiving device and a holding element being adjustable relative to said line receiving device by said triggering drive;
- said non-contacting sensor configured to detect a vibration progression; and
- said evaluation device configured to derive mechanical properties of the overhead line from the vibration progression.

* * * * *